(12) United States Patent
Wei et al.

(10) Patent No.: US 11,893,142 B2
(45) Date of Patent: Feb. 6, 2024

(54) INTEGRATED CIRCUIT, AND DIGITAL FINGERPRINT GENERATION CIRCUIT AND METHOD THEREOF

(71) Applicants: Beijing BOE Technology Development Co., Ltd., Beijing (CN); BOE Technology Group Co., Ltd., Beijing (CN)

(72) Inventors: Xiangye Wei, Beijing (CN); Yiming Bai, Beijing (CN); Liming Xiu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 286 days.

(21) Appl. No.: 17/503,167

(22) Filed: Oct. 15, 2021

(65) Prior Publication Data

US 2022/0180001 A1 Jun. 9, 2022

(30) Foreign Application Priority Data

Dec. 3, 2020 (CN) .......................... 202011414605.7

(51) Int. Cl.
  *G06F 21/73* (2013.01)
  *G06F 21/72* (2013.01)
  *G06F 1/08* (2006.01)

(52) U.S. Cl.
  CPC .............. *G06F 21/725* (2013.01); *G06F 1/08* (2013.01); *G06F 21/73* (2013.01); *G06F 2221/2103* (2013.01)

(58) Field of Classification Search
  CPC .......... G06F 21/725; G06F 21/73; G06F 1/08; G06F 1/06; G06F 2221/2103; H04L 9/3278; H03K 3/02
  See application file for complete search history.

(56) References Cited

U.S. PATENT DOCUMENTS

| | | | | |
|---|---|---|---|---|
| 2013/0276151 A1* | 10/2013 | Lewis | ..................... | G06F 21/44 |
| | | | | 726/34 |
| 2014/0201851 A1* | 7/2014 | Guo | ........................ | G09C 1/00 |
| | | | | 726/34 |

(Continued)

FOREIGN PATENT DOCUMENTS

| | | | | |
|---|---|---|---|---|
| CA | 2482635 C | * | 9/2014 | ............. G06F 21/31 |
| CN | 105956494 A | * | 9/2016 | ............. G06F 21/73 |

(Continued)

*Primary Examiner* — Seokjin Kim
(74) *Attorney, Agent, or Firm* — IPro, PLLC

(57) ABSTRACT

A digital fingerprint generation circuit based on an integrated circuit is provided. In the digital fingerprint generation circuit, a control unit is configured to: generate a first control word and a second control word, and transmit the first control word and the second control word to a first clock generator and a second clock generator respectively, so that the first clock generator generates a first clock signal based on the first control word, and the second clock generator generates a second clock signal based on the second control word; and a frequency detector generates a digital fingerprint of the integrated circuit based on the first clock signal and the second clock signal.

20 Claims, 4 Drawing Sheets

(56) References Cited

U.S. PATENT DOCUMENTS

| | | | |
|---|---|---|---|
| 2014/0225639 A1* | 8/2014 | Guo | H03K 5/156 |
| | | | 331/46 |
| 2015/0101037 A1* | 4/2015 | Yang | H04L 9/3278 |
| | | | 726/16 |
| 2022/0045703 A1* | 2/2022 | Wei | G06F 1/08 |

FOREIGN PATENT DOCUMENTS

| | | | | |
|---|---|---|---|---|
| CN | 105978889 A | * | 9/2016 | G06F 21/32 |
| CN | 110022214 A | * | 7/2019 | G06F 21/575 |
| CN | 111027102 B | * | 5/2023 | G06F 21/72 |
| EP | 2422368 B1 | * | 4/2018 | G06F 7/588 |

* cited by examiner

INTEGRATED CIRCUIT, AND DIGITAL FINGERPRINT GENERATION CIRCUIT AND METHOD THEREOF

CROSS-REFERENCE TO RELATED APPLICATION

This application is based on and claims priority to Chinese Patent Application No. 202011414605.7, filed on Dec. 3, 2020 and entitled "INTEGRATED CIRCUIT, AND DIGITAL FINGERPRINT GENERATION CIRCUIT AND METHOD THEREOF", the disclosure of which is herein incorporated by reference in its entirety.

TECHNICAL FIELD

The present disclosure relates to the field of integrated circuit technologies, and more particularly, to an integrated circuit, and a digital fingerprint generation circuit and method thereof.

BACKGROUND

In the high-speed information age, and the dual background of the 5G and Internet, security is a critical. First, security is a basis of communication, and accurate transmission of data is the fundamental purpose of communication. Second, the meaning of the security becomes broader and extends outwardly from purely data encryption and authentication, such as privacy protection, time synchronization, isolation zone protection, and core IP protection, etc. Furthermore, after smart terminals are applied in society, many devices are destructive and threaten vital health of human. Finally, the promotion of digital economy requires safety as a basis to build a harmonious, safe and stable society.

Under the situation of such a huge challenge, a Physical Unclonable Function (PUF) is generated, which is also referred to as a chip digital fingerprint.

In the manufacturing process of an integrated circuit, process errors cause deviations in the circuit performance and design. These deviations are extracted and converted into digital signs, which become digital fingerprints of the circuit or the chip. Operations such as device authentication, authorization, data encryption and decryption may be completed by taking the digital fingerprint as the chip ID.

SUMMARY

The present disclosure provides an integrated circuit, and a digital fingerprint generation circuit and method thereof.

In a first aspect of the present disclosure, a digital fingerprint generation circuit based on an integrated circuit is provided. The digital fingerprint generation circuit includes: a control unit, a first clock generator, a second clock generator, and a frequency detector, wherein the control unit is electrically coupled with the first clock generator and the second clock generator, and the control unit is configured to: generate a first control word and a second control word, transmit the first control word to the first clock generator, and transmit the second control word to the second clock generator; the first clock generator is further electrically coupled with the frequency detector, and the first clock generator is configured to: generate a first clock signal based on the first control word and transmit the first clock signal to the frequency detector; the second clock generator is further electrically coupled with the frequency detector, and the second clock generator is configured to: generate a second clock signal based on the second control word and transmit the second clock signal to the frequency detector; and the frequency detector is configured to generate a digital fingerprint of the integrated circuit based on the first clock signal and the second clock signal; wherein the first clock generator and the second clock generator have different manufacturing deviations, and both of the first control word and the second control word have an integer portion and a fraction portion.

In a second aspect of the present disclosure, an integrated circuit is provided. The integrated circuit includes a power source and a digital fingerprint generation circuit, wherein the power source is electrically coupled with the digital fingerprint generation circuit, and the power source is configured to supply power to the digital fingerprint generation circuit; wherein the digital fingerprint generation circuit includes: a control unit, a first clock generator, a second clock generator, and a frequency detector, wherein the control unit is electrically coupled with the first clock generator and the second clock generator, and the control unit is configured to: generate a first control word and a second control word, transmit the first control word to the first clock generator, and transmit the second control word to the second clock generator; the first clock generator is further electrically coupled with the frequency detector, and the first clock generator is configured to: generate a first clock signal based on the first control word and transmit the first clock signal to the frequency detector; the second clock generator is further electrically coupled with the frequency detector, and the second clock generator is configured to: generate a second clock signal based on the second control word and transmit the second clock signal to the frequency detector; and the frequency detector is configured to generate a digital fingerprint of the integrated circuit based on the first clock signal and the second clock signal; wherein the first clock generator and the second clock generator have different manufacturing deviations, and both of the first control word and the second control word have an integer portion and a fraction portion.

In a third aspect of the present disclosure, a digital fingerprint generation method of an integrated circuit is provided. The method is applicable to a digital fingerprint generation circuit, and the digital fingerprint generation circuit includes: a control unit, a first clock generator, a second clock generator, and a frequency detector, wherein the control unit is electrically coupled with the first clock generator and the second clock generator, and both of the first clock generator and the second clock generator are further electrically coupled with the frequency detector. The method includes: generating a first control word and a second control word and transmitting the first control word to the first clock generator and the second control word to the second clock generator by the control unit; generating a first clock signal based on the first control word and transmitting the first clock signal to the frequency detector by the first clock generator; generating a second clock signal based on the second control word and transmitting the second clock signal to the frequency detector by the second clock generator; and generating a digital fingerprint of the integrated circuit based on the first clock signal and the second clock signal by the frequency detector; wherein the first clock generator and the second clock generator have different manufacturing deviations, and both of the first control word and the second control word have an integer portion and a fraction portion.

As can be seen from above, according to the integrated circuit and the digital fingerprint generation circuit and method thereof provided in the embodiments of the present disclosure, the number of valid bits of the digital fingerprint is increased and the security of the integrated circuit is improved by adding the fraction in the control word.

BRIEF DESCRIPTION OF THE DRAWINGS

To describe the technical solutions in the present disclosure or in the prior art more clearly, the following briefly introduces the accompanying drawings required for describing the embodiments or the prior art. Apparently, the accompanying drawings in the following description merely show some embodiments of the present disclosure, and persons of ordinary skill in the art may still derive other drawings from these accompanying drawings without creative efforts.

DETAILED DESCRIPTION

Figure 1:
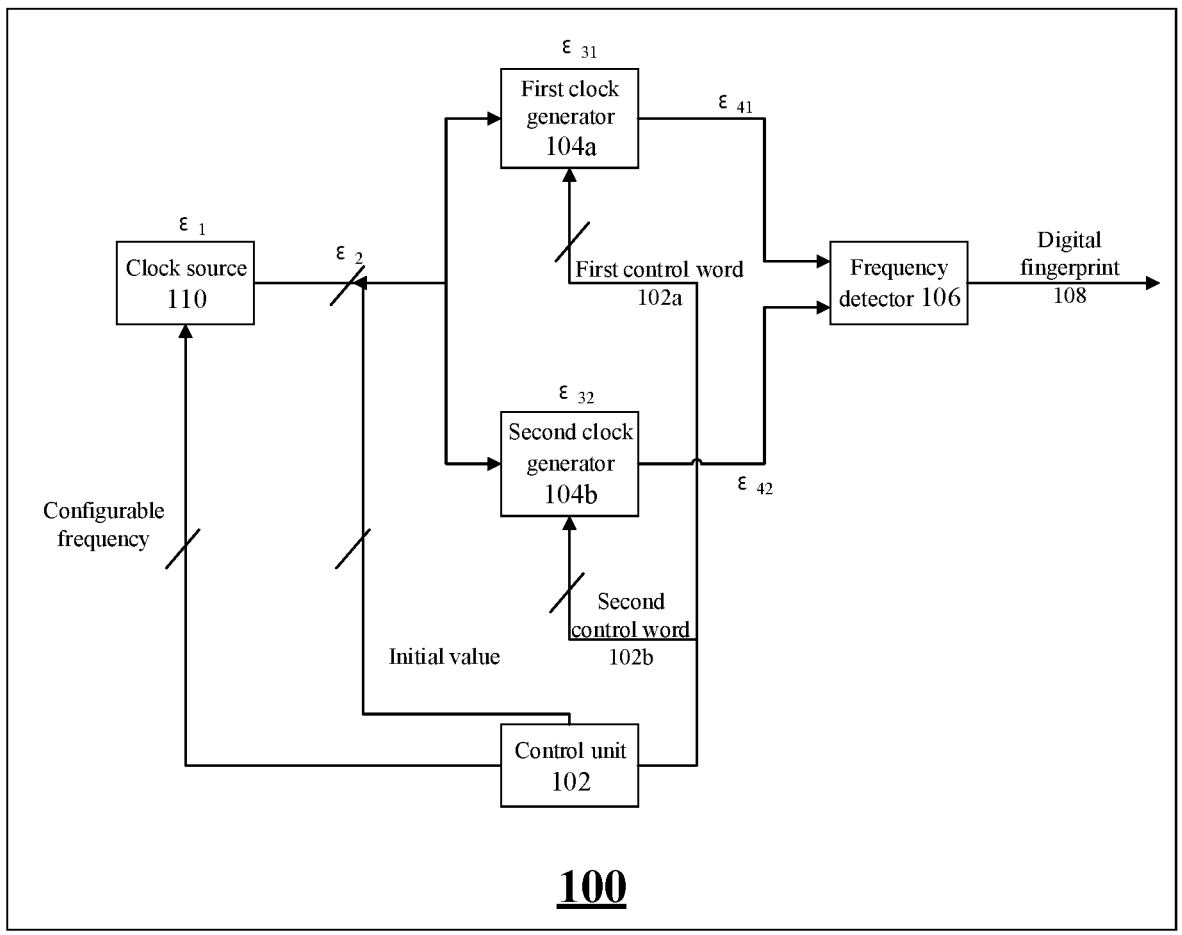
FIG. 1 is a schematic structural diagram of an exemplary digital fingerprint generation circuit according to an embodiment of the present disclosure.

For clearer descriptions of the objectives, technical solutions, and principles of the embodiments of the present disclosure, the present disclosure is described in detail hereinafter in combination with specific embodiments and with reference to the accompanying drawings.

It should be noted that unless otherwise defined, technical or scientific terms used in the present disclosure shall have ordinary meaning understood by persons of ordinary skill in the art to which the disclosure belongs. The terms "first", "second" and the like used in the present disclosure are not intended to indicate any order, quantity or importance, but are merely used to distinguish different components. The terms "comprise, comprises and comprising" or "include, includes and including" and the like are used to indicate that the element or object preceding the terms covers the element or object following the terms and its equivalents, and shall not be understood as excluding other elements or objects. The terms "connect" or "couple" and the like are not intended to be limited to physical or mechanical connections, but may include electrical connections, either direct or indirect connection.

The embodiments of the present disclosure provide an integrated circuit, and a digital fingerprint generation circuit and method thereof. The digital fingerprint generation circuit based on the integrated circuit includes a control unit, a first clock generator, a second clock generator, and a frequency detector. Both of the control unit and the frequency detector are electrically coupled with the first clock generator and the second clock generator. The control unit is configured to generate a first control word and a second control word, transmit the first control word to the first clock generator, and transmit the second control word to the second clock generator. The first clock generator is configured to generate a first clock signal based on the first control word and transmit the first clock signal to the frequency detector. The second clock generator is configured to generate a second clock signal based on the second control word and transmit the second clock signal to the frequency detector. The frequency detector is configured to generate a digital fingerprint of the integrated circuit based on the first clock signal and the second clock signal.

Here, the first clock generator and the second clock generator have different manufacturing deviations, and both of the first control word and the second control word have an integer portion and a fraction portion. According to the integrated circuit, and the digital fingerprint generation circuit and method thereof provided in the embodiments of the present disclosure, the number of valid bits of the digital fingerprint is increased and the security of the integrated circuit is improved by increasing the fraction in the control word.

From a security perspective, the embodiments of the present disclosure may be examples of implementations of a Physical Unclonable Function (PUF). The PUF is a unique identity of a "digital fingerprint" of an integrated circuit (or a chip) or the like.

The PUF is naturally generated in the manufacturing process of a semiconductor, and may be used to distinguish between physical changes of different semiconductors. The PUF depends on the uniqueness of a physical microstructure of the chip. The microstructure depends on random physical factors (or referred to as a manufacturing deviation) introduced in the manufacturing process. These factors are unpredictable and uncontrollable, which makes replication or cloning structure almost impossible. The PUF implements challenge-response authentication to evaluate the microstructure. When a physical stimulus is applied to the microstructure, it reacts in an unpredictable (but repeatable) manner due to a complex interaction between the stimulus and the physical microstructure of the device. The precise microstructure depends on the unpredictable physical factors introduced in the manufacturing process. The applied stimulus is referred to as a challenge, and a reaction of the PUF is referred to as a response. The specific challenge and corresponding response together form a challenge-response pair. The identity of the integrated circuit is established by the nature of the microstructure itself. As the microstructure will not be directly exposed by the challenge-response mechanism, the integrated circuit is anti-spoofing and anti-attack. Using a key extractor, the PUF may also be used to extract a unique strong encryption key from the physical microstructure. The same unique key is reconstructed each time a PUF is evaluated. The challenge-response mechanism may then be implemented by a known cryptographic method.

FIG. 1 shows a schematic structural diagram of an exemplary digital fingerprint generation circuit. The digital fingerprint generation circuit 100 includes a control unit 102, a first clock generator 104a, a second clock generator 104b, a frequency detector 106, and a clock source 110.

The clock source 110 is electrically coupled with the first clock generator 104a, the second clock generator 104b, and the control unit 102. The clock source 110 may generate a clock signal of an integrated circuit, and a frequency of the clock signal generated by the clock source 110 may be configured by the control unit 102.

The control unit 102 is electrically coupled with the first clock generator 104a and the second clock generator 104b. The control unit 102 may generate a first control word 102a and a second control word 102b, and transmit the first control word 102a and the second control word 102b to the first clock generator 104a and the second clock generator 104b, respectively. That is, the first control word 102a is transmitted to the first clock generator 104a and the second control word 102b is transmitted to the second clock generator 104b.

The first clock generator 104a is electrically coupled with the control unit 102. The first clock generator 104a may generate a first clock signal based on the first control word 102a and transmit the first clock signal to the frequency detector 106.

In some embodiments, the first clock generator 104a may be a clock generator based on a time-average-frequency direct period synthesis (TAF-DPS) (referring to FIG. 2A), short for TAF-DPS clock generator. The first control words may be periodically accumulated in the first clock generator 104a (e.g., accumulated by an accumulator in the TAF-DPS clock generator) to generate first clock signals having different periods. That is, the first clock generator 104a may periodically accumulate the first control words 102a to generate the first clock signals having different periods.

The second clock generator 104b is electrically coupled with the control unit 102. The second clock generator 104b may generate a second clock signal based on the second control word 102b, and transmit the second clock signal to the frequency detector 106.

In some embodiments, the second clock generator 104b may be a clock generator based on the TAF-DPS (referring to FIG. 2). The second control words may be periodically accumulated in the second clock generator 104b (e.g., accumulated by the accumulator in the TAF-DPS clock generator) to generate second clock signals having different periods. That is, the second clock generator 104b may periodically accumulate the second control words 102b to generate the second clock signals having different periods.

The frequency detector 106 may generate a digital fingerprint 108 of the integrated circuit based on the received first clock signal and the second clock signal.

In some embodiments, the frequency detector 106 may be a D flip-flop. As such, when a difference between a period of the second clock signal and a period of the first clock signal is greater than or equal to a difference threshold (e.g., 0), the D flip-flop may output a first parameter value (e.g., 1). When the difference between the period of the second clock signal and the period of the first clock signal is less than the difference threshold (e.g., 0), the D flip-flop may output a second parameter value (e.g., 0). After a plurality of periods, a string consisting of at least one first parameter value and at least one second parameter value is formed by the output of the D flip-flop (e.g., a sequence consisting of 0/1), thereby forming the digital fingerprint of the integrated circuit.

Figure 2A:
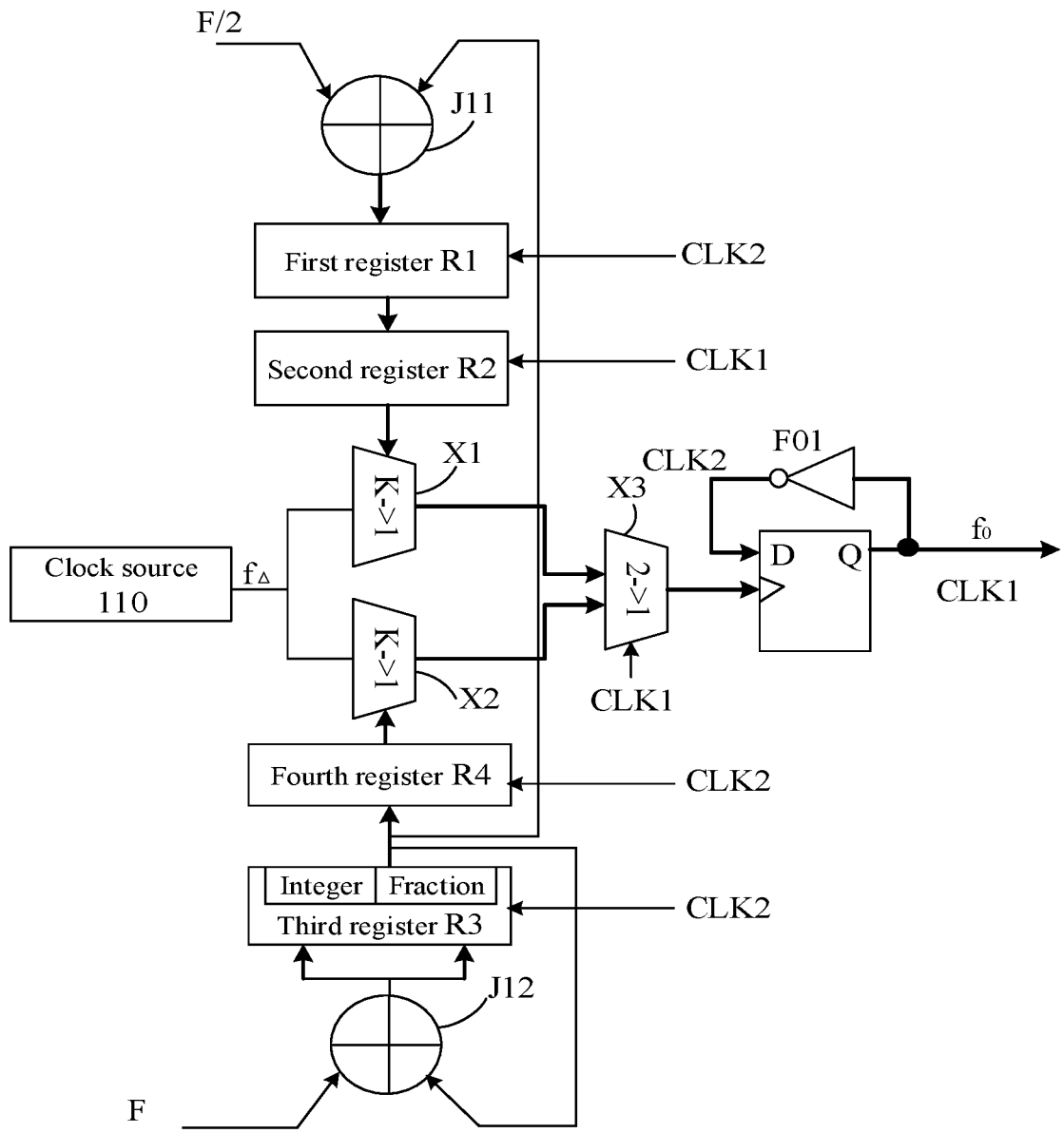
FIG. 2A is a schematic circuit structure diagram of an exemplary clock generator according to an embodiment of the present disclosure.

FIG. 2A shows a schematic circuit structure diagram of an exemplary clock generator according to an embodiment of the present disclosure (e.g., the TAF-DPS clock generator). The TAF-DPS clock generator may be the first clock generator 104a or the second clock generator 104b.

Figure 2B:
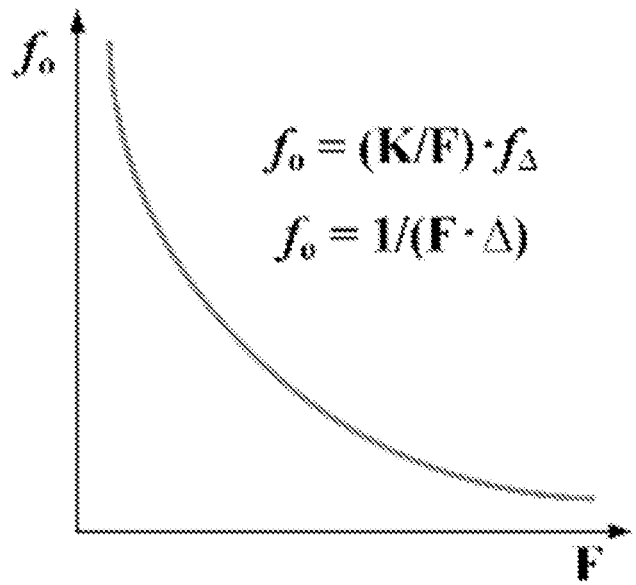
FIG. 2B is schematic diagram showing an exemplary relationship between a clock generator and a control word according to an embodiment of the present disclosure.

As shown in FIG. 2, the clock generator may include a first register R1, a second register R2, a third register R3, a fourth register R4, a first adder J11, a second adder J12, a first selector X1, a second selector X2, a third selector X3, the D flip-flop, and a first inverter F01. The first adder J11 may be connected to the first register R1, and the second adder J12 may be connected to the third register R3. The first adder J11, the first register R1, the second register R2, and the first selector X1 are connected sequentially, and the second adder J12, the third register R3, the fourth register R4, and the second selector X2 are connected sequentially. The second register R2 may further be connected to a first clock signal terminal CLK1, and the first register R1, the third register R3, and the fourth register R4 may further be connected to a second clock signal terminal CLK2. The first selector X1 may further be connected to the clock source 102, and the second selector X2 may further be connected to the third selector X3. The third selector X3 may further be connected to a first input terminal of the D flip-flop and the first clock signal terminal CLK1. A second input terminal of the D flip-flop may be connected to an output terminal of the first inverter F01, and an input terminal of the first inverter FOI may be connected to an output terminal of the D flip-flop. It should be noted that, with reference to FIG. 2, the output terminal of the D flip-flop may act as an output of the first clock signal terminal CLK1, the output terminal of the first inverter F01 may act as an output of the second clock signal terminal CLK2, and clock signals provided by the first clock signal terminal CLK1 and the second clock signal terminal CLK2 have opposite phase and same frequency. The relationship between the output $f_0$ of the TAF-DPS clock generator and the control word F is shown in FIG. 2B. Here, the clock signal generated by the clock source 110 has K pulses with a pulse interval A, denoted as $f_A$.

Taking the TAF-DPS clock generator as the clock generator for example, the operating principle of the exemplary digital fingerprint generation circuit 100 is as follows.

Designs of the first clock generator 104a and the second clock generator 104b are the same, but manufacturing deviations may occur in manufacturing process. For example, as shown in FIG. 1, a manufacturing deviation of the first clock generator 104a is $\varepsilon_{31}$, and a manufacturing deviation of the second clock generator 104b is $\varepsilon_{32}$. As such, a clock period $T_{DPS1}$ of the first clock signal generated by the first clock generator 104a and a clock period $T_{DPS2}$ of the second clock signal generated by the second clock generator 104b are inconsistent. In some cases, the manufacturing deviations may also occur in other parts of the integrated circuit. For example, as shown in FIG. 1, the clock source 110 itself may also have a manufacturing deviation el, a transmission path between the clock source 110 and the first clock generator 104a and/or a transmission path between the clock source 110 and the second clock generator 104b may also have a manufacturing deviation $\varepsilon_2$, a transmission path between the first clock generator 104a and the frequency detector 106 may also have a manufacturing deviation se, and/or a transmission path between the second clock generator 104b and the frequency detector 106 may also have a manufacturing deviation $\varepsilon_{42}$. Each of the manufacturing variations may finally result in a difference between the clock period $T_{DPS1}$ of the first clock signal and the clock period $T_{DPS2}$ of the second clock signal. Thus, it can be defined:

when $\Delta T = T_{DPS2} - T_{DPS1} \geq 0$, a circuit DFF outputs a fixed value bm=1;

when $\Delta T = T_{DPS2} - T_{DPS1} < 0$, the circuit DFF outputs a fixed value bm=0.

The DFF circuit is a digital fingerprint generation circuit 100 including the D flip-flop. A fixed 0/1 sequence is obtained through a series of combinations of $\Delta T$, and the sequence is the digital fingerprint of the chip.

By taking an example in which the digital fingerprint generation circuit of the embodiments of the present disclosure is a TAF-DPS clock generator, the challenge may be defined as:

Challenge={F,INV};

where F is the control word of the clock generator (e.g., the TAF-DPS clock generator), the range of the value of F is [2, 2K], and the value of F is an integer. INV is an initial address of the TAF-DPS clock generator (i.e., a first state at which the TAF-DPS-PUF begins to operate, and the initial address of a plurality of selectors in the TAF-DPS clock generator), the range of the value of INV is [0, K−1], and the value of INV is an integer. As can be seen, the challenge to the digital fingerprint generation circuit may be a set including the first control word, the second control word, the first initial address of the first clock signal, and the second initial address of the second clock signal.

The PUF of the TAF-PDS clock generator can be defined as f( ), then the chip digital fingerprint (the response from the PUF to some challenge) may be expressed as:

Response=FB

FB=f(F,INV).

That is, the response from the digital fingerprint generation circuit to the challenge (the output of the frequency detector 106) is the digital fingerprint, and the response is the PUF with reference to the first control word, the second control word, the first initial address of the first clock signal, and the second initial address of the second clock signal.

An accumulation operation completed by the control word F in the TAF-DPS clock generator is completed by a hardware accumulator in the TAF-DPS clock generator. As the bit number of the hardware accumulator is limited, such as the maximum of a 4-bit accumulator is 1111, if further plus 1, it will overflow and become 0000. The formula is that the accumulator returns to the original state after a major period (which may be referred to as a first period). For example, F=2, and the accumulator has 4 bits (i.e., K=16). Then, after 8 periods (which may be referred to as a second period, and the second period refers to the control word accumulating once each time the second period passes), e.g., 2→4→6→8→10→12→14→16(0)→2, the control word F goes back to 2. The first period means a cycle of sequences under limited resource. Thus, the response contains the first period Ω, which may be expressed as:

Ω=K/gcd(F,K), where gcd (F,K) is the maximum common factor of the control word F and the number K of the initial address. For example, when F=2 and K=8, Ω=4.

Due to the presence of the first period Ω, a response length generated for one challenge {F, INV} is ΩK. For example, F=2 and K=8, the generated response is 32 bit. A change in the control word in the response is:

2→4→6→8(0)→2→4→ . . . .

That is, a cycle starts after 4 second periods (i.e., the first period is 4 times the second period). In this case, a generated digital fingerprint data bit may repeat and will not introduce new information entropy, so that only the first 4 bits of the digital fingerprint have a security reliability.

To solve such a problem, both of the first control word 102a and the second control word 102b provided in the embodiments of the present disclosure have an integer portion and a fraction portion. The integer portion may be any natural number, e.g., 1, 2, 3, or the like. The fraction portion may be any fraction between 0 and 1, e.g., 0.1, 0.15, 0.2, 0.24, 0.3, or the like. In some embodiments, the first control word 102a and the second control word 102b may be, for example, 2.5, wherein the integer portion is 2 and the fraction portion is 0.5.

As shown in FIG. 2A, after the integer and fraction in the third register R3 in the figure, that is, the integer portion and the fraction portion of the second adder J12, are accumulated, only the integer portion is transferred to the next stage register. In the embodiments of the present disclosure, the control word F increases the fractional portion, e.g., 0.5. Assuming F=2.5 and K=8, then the response length $FB_{length}$ becomes:

$FB_{length} = [K/gcd(F,K)] \cdot K = (8/0.5) \cdot 8 = 128.$ $FB_{length}$ is increased by four times as compared to that when there is no fraction portion.

The change of the control word F (the accumulated result of the accumulator, $F_{n+1}=(F_n+F) \mod K$, $F_{n+1}$, is a accumulated value, $F_n$ is a value before accumulating, F is a accumulated amount each time) may be:

2→5→7→2→4→7→1→4→6→1→3→6→8→3→5→8
(0)→2→5→7 . . . .

As can be seen, after the control word F increases the fraction portion 0.5, a cycle starts after every 16 second periods, i.e., the first period is 8/0.5=16. All response lengths generated by F after introducing the fraction portion 0.5 are $2K^2$. The accumulation period Q of all the control words F is changed to 2K by introducing the fraction portion 0.5, to normalize the sequence. The value of the control word F cannot exceed 2K, so the value of F becomes [2, 2K−1] in the case where the fraction portion is available. Further, the total length of the response (total length of the digital fingerprint) $FFB_{length}$ that may be generated by the TAF-DPS-PUF may be expressed as:

$FFB_{length} = (2K-2) \cdot 2K \cdot K = 4(K^3 - K^2).$

When the control word F does not have the fraction portion, the corresponding total length FFB'length of the digital fingerprint may be expressed as:

$$FFB' \text{ legnth} = \sum_{i=2}^{2k} \Omega_{F=i} * K = L_{\Omega=1} + L_{\Omega=K} + L_{2 \leq \Omega \leq \frac{K}{2}}$$

$$= 2 * K + (K-1) * K + \sum_{j=1}^{\log_2\left(\frac{K}{2}\right)} \Omega_{F=i} * \Omega_{F=i} * K$$

$$= \frac{4K^3 - 2K4K^2 + 2K}{3}$$

A comparison between the fingerprint lengths of the control word F with or without fraction portion is shown in Table 1.

TABLE 1

| | Comparison between two types of fingerprint lengths | | | | | |
|---|---|---|---|---|---|---|
| Type | Total length of fingerprint | K = 4 | K = 8 | K = 16 | K = 32 | K = 64 |
| With Fraction | $4(K^3-K^2)$ | 192 | 1792 | 15360 | 126976 | 1032192 |
| Without fraction | $(4K^3-3K^2 + 2K)/3$ | 72 | 624 | 5216 | 42688 | 345472 |

As can be seen, the digital fingerprint generation circuit provided in the embodiments of the present disclosure may effectively increase the overall length and the effective length of the digital fingerprint, and the overall length and the effective length of the digital fingerprint are important indicators indicating the security of the fingerprint. When the generated digital fingerprints are cracked by the same computer, the longer the total length and effective length of the digital fingerprint, the longer the cracking time. Therefore, the digital fingerprint generation circuit provided in the embodiments of the present disclosure may improve the security of the integrated circuit.

It should be noted that, in the embodiments described above, 0.5 is used as the fraction portion of the control word such that the total length of the digital fingerprint after increase may be the longest and the repetition period of the control word F is also the longest, and thus the effective length of the digital fingerprint is also longer. Moreover, the numerals 1 to 8 may be traversed in one cycle (the first period), and the utilization is also higher. However, it should be understood that although a relatively great effect may be obtained by using 0.5 as the fraction portion of the control word, the fraction portion may be selected according to requirement in actual implementation. For example, the fraction portion may be 0.3, 0.4, 0.6, or the like, and these embodiments should also fall within the protection scope of the embodiments of the present disclosure.

In the digital fingerprint generation circuit provided in the embodiments of the present disclosure, the length of the TAF-DPS-PUF digital fingerprint length is greatly increased. By introducing the fraction portion in the TAF-DPS clock generator in the TAF-DPS-PUF and setting the fraction to 0.5, such subtle changes in the circuit greatly increase the length of the fingerprint, with consumption of a small amount of resources.

Figure 3:
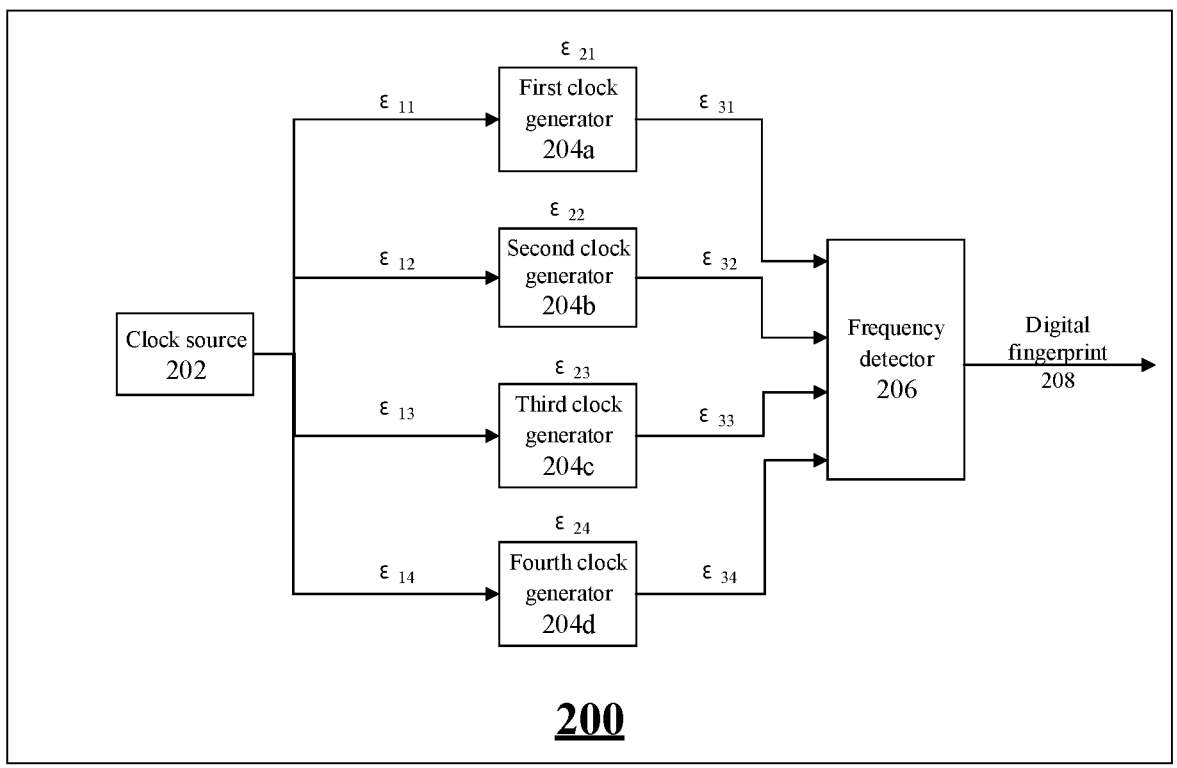
FIG. 3 is a schematic structural diagram of another exemplary digital fingerprint generation circuit according to an embodiment of the present disclosure.

FIG. 3 shows a schematic diagram of an exemplary digital fingerprint generation circuit 200 according to an embodiment of the present disclosure.

The digital fingerprint generation circuit 200 includes the clock source 202, the first clock generator 204a, the second clock generator 204b, the third clock generator 204c, and the fourth clock generator 204d (each of the clock generators may be a TAF-DPS clock generator) and the frequency detector 206.

The control unit (not shown in FIG. 3) may be electrically coupled with the first clock generator 204a, the second clock generator 204b, the third clock generator 204c, and the fourth clock generator 204d. The control unit is configured to: generate the first control word, the second control word, the third control word, and the fourth control word, and transmit the first control word, the second control word, the third control word, and the fourth control word to the first clock generator 204a, the second clock generator 204b, the third clock generator 204c, and the fourth clock generator 204d, respectively. That is, the first control word is transmitted to the first clock generator 204a, the second control word is transmitted to the second clock generator 204b, the third control word is transmitted to the third clock generator 204c, and the fourth control word is transmitted to the fourth clock generator 204d.

The first clock generator 204a is further electrically coupled with the frequency detector 206. The first clock generator 204a may generate the first clock signal based on the first control word and transmit the first clock signal to the frequency detector 206.

The second clock generator 204b is further electrically coupled with the frequency detector 206. The second clock generator 204b may generate the second clock signal based on the second control word and transmit the second clock signal to the frequency detector 206.

The third clock generator 204c is further electrically coupled with the frequency detector 206. The third clock generator 204c may generate the third clock signal based on the third control word and transmit the third clock signal to the frequency detector 206.

The fourth clock generator 204d is further electrically coupled with the frequency detector 206. The fourth clock generator 204d may generate the fourth clock signal based on the fourth control word and transmit the fourth clock signal to the frequency detector 206.

The frequency detector 206 may generate the digital fingerprint 208 of the integrated circuit based on any two of the first clock signal, the second clock signal, the third clock signal, and the fourth clock signal. That is, every arbitrary two clock signals may generate a set of digital fingerprints.

Here, the first clock generator 204a, the second clock generator 204b, the third clock generator 204c, and the fourth clock generator 204d have different manufacturing deviations from each other, and each of the first control word, the second control word, the third control word, and the fourth control word has an integer portion and a fraction portion. The digital fingerprint total length $FFB_{length}$ generated by the digital fingerprint generation circuit 200 may be expressed as:

$$FFB_{length} = \frac{m(m-1)}{2} * 4(K^3 - K^2) = 2(m^2 - m)(K^3 - K^2),$$

where m is the number of clock generators. For example, when m=4 and K=8, the digital fingerprint total length $FFB_{length}$=10752, which is 6 times of the total length when there are only 2 TAF-DPS clock generators.

According to the digital fingerprint generation circuit provided in the embodiments of the present disclosure, by increasing the number of TAF-DPS clock generators, introducing multiplexing mechanisms, and increasing the physical entropy source and original physical space uncertainty, the randomness and unpredictability of the TAF-DPS-PUF is increased, which may further improve the fingerprint length of the TAF-DPS-PUF, increase the security of the circuit, provide sufficient bit-length to handle cracking for high performance cracking calculations.

The digital fingerprint generation circuit provided in the embodiments of the present disclosure may be used in high performance secure IP, fingerprint identification, cryptography, security protection, and encryption, etc., and may be integrated in products with high security requirements to provide a high level of security assurance for terminal devices.

Figure 4:
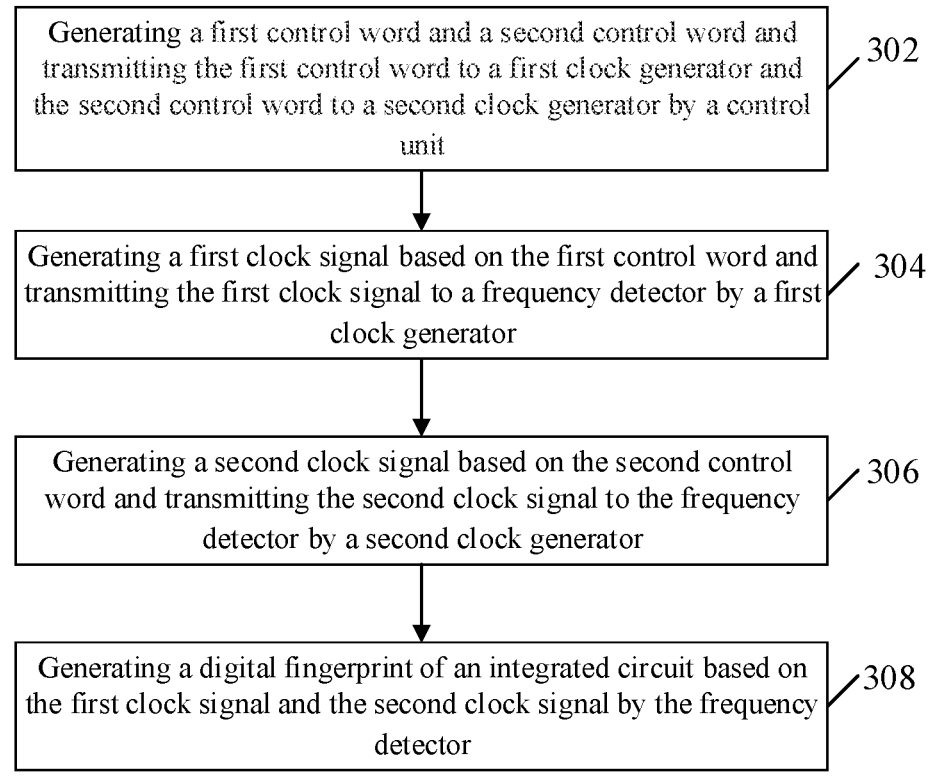
FIG. 4 is a flow chart showing an exemplary digital fingerprint generation method according to an embodiment of the present disclosure.

FIG. 4 shows a flow chart showing an exemplary method 300 of generating a digital fingerprint according to an embodiment of the present disclosure.

As shown in FIG. 4, the method 300 of generating a digital fingerprint of an integrated circuit includes the following steps.

In step 302, a control unit generates a first control word and a second control word, and transmits the first control word to a first clock generator and transmits the second control word to a second clock generator.

In step 304, a first clock generator generates a first clock signal based on the first control word, and transmits the first clock signal to a frequency detector.

In step 306, a second clock generator generates a second clock signal based on the second control word, and transmits the second clock signal to the frequency detector.

In step 308, the frequency detector generates the digital fingerprint of the integrated circuit based on the first clock signal and the second clock signal.

Here, the first clock generator and the second clock generator have different manufacturing deviations, and both of the first control word and the second control word have an integer portion and a fraction portion.

In some embodiments, generating the digital fingerprint of the integrated circuit based on the first clock signal and the second clock signal by the frequency detector includes: outputting a first parameter value by the frequency detector, in response to the difference between a period of the second clock signal and a period of the first clock signal being greater than or equal to a difference threshold; and outputting a second parameter value by the frequency detector, in response to the difference between the period of the second clock signal and the period of the first clock signal being less than the difference threshold.

After a plurality of periods, the digital fingerprint of the integrated circuit is formed by at least one first parameter value and at least one second parameter value output by the frequency detector.

In some embodiments, both of the first clock generator and the second clock generator are clock generators based on the time-average-frequency direct period synthesis.

Generating the first clock signal based on the first control word by the first clock generator includes: periodically accumulating the first control words in the first clock generator to generate first clock signals having different periods.

Generating the second clock signal based on the second control word by the second clock generator includes: periodically accumulating the second control words in the second clock generator to generate second clock signals having different periods.

In some embodiments, the fraction portion is 0.5.

In some embodiments, in combination with FIG. 3, the method 300 further includes the followings.

The control unit generates a third control word and a fourth control word, and transmits the third control word and the fourth control word to the third clock generator and the fourth clock generator, respectively.

A third clock generator generates a third clock signal based on the third control word, and transmits the third clock signal to the frequency detector.

A fourth clock generator generates a fourth clock signal based on the fourth control, and transmits the fourth clock signal to the frequency detector.

In step 308, the frequency detector may generate the digital fingerprint of the integrated circuit based on any two of the first clock signal, the second clock signal, the third clock signal, and the fourth clock signal.

Here, the first clock generator, the second clock generator, the third clock generator, and the fourth clock generator have different manufacturing deviations from each other, and both of the third control word and the fourth control word having an integer portion and a fraction portion.

It should be noted that the method provided in the embodiments of the present disclosure may be performed by a single device, such as a computer, a server, or the like. The method provided in the embodiments of the present disclosure may further performed by a plurality of devices in cooperation in a distributed scenario. In the case of the distributed scenario, one of the plurality of devices may perform merely one or more steps of the method of the embodiments of the present disclosure, and the plurality of devices will interact with each other to perform the method.

Figure 5:
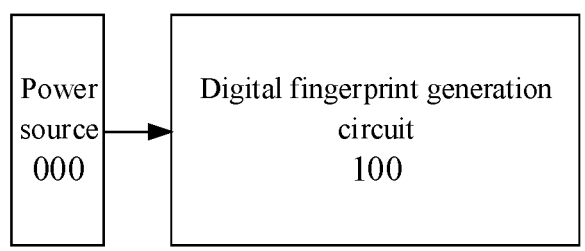
FIG. 5 is a schematic structural diagram of an integrated circuit according to an embodiment of the present disclosure.

FIG. 5 shows a schematic structural diagram of an integrated circuit. As shown in FIG. 5, the integrated circuit may include a power source 000 and a digital fingerprint generation circuit 100. The digital fingerprint generation circuit 100 may be the circuit shown in FIG. 1 or FIG. 3. The power source 000 may be electrically coupled with the digital fingerprint generation circuit 100 and be configured to supply power to the digital fingerprint generation circuit 100.

It should be noted that some specific embodiments of the present disclosure are described above and other embodiments are within the scope of the appended claims. In some cases, the actions or steps recorded in the claims may be performed in an order different from that in the embodiments and the desired results can still be achieved. In addition, the processes described in the accompanying drawings may be performed in orders other than the particular order or sequential order and the desired results can still be achieved. In some implementations, multitasking and parallel processing are also possible or may be advantageous.

The digital fingerprint generation circuit of the foregoing embodiments may be configured to implement any of the corresponding digital fingerprint generation methods in the foregoing embodiments and have the beneficial effect of the corresponding method embodiments. Therefore, the beneficial effects of the method embodiments are not repeated herein.

Persons of ordinary skill in the art should understand that the discussions on any of the foregoing embodiments are only exemplary and are not intended to imply that the scope of the embodiments of the present disclosure (including claims) is limited to such examples. Under the idea of the embodiments of the present disclosure, the foregoing embodiments or the technical features in different embodiments may also be combined, the steps may be executed in any order, and there are many other various changes on different aspects of the embodiments of the present disclosure as described above, which are not provided in detail for simplicity.

In addition, in order to simplify the explanations and discussions and not to make the embodiments of the present disclosure difficult to understand, known power/ground connections of the integrated circuit (IC) chips and other components may or may not be shown in the accompanying drawings. In addition, the devices may be shown in the form of block diagram, in order to avoid making the present disclosure difficult to understand and in consideration of the facts that the details about the implementations of the devices in block diagrams are highly depend on the platform for implementing the embodiments of the present disclosure (that is, the details shall be entirely within the scope understood by persons skilled in the art). Where specific details (e.g., circuits) are provided to describe exemplary embodiments of the present disclosure, it is obvious to persons skilled in the art that the present disclosure may be implemented without the specific details or in the case that variations are made to these specific details. Therefore, the descriptions should be considered illustrative rather than restrictive.

Although the present disclosure has been described in conjunction with specific embodiments of the present disclosure, many substitutions, modifications, and variations of the embodiments will be obvious to persons of ordinary skill in the art based on the foregoing descriptions. The present disclosure is intended to cover all such substitutions, modifications and variations within the broad scope of the appended claims. Therefore, any omission, modification, equivalent substitutions, improvements made within the spirit and principles of the embodiments of the present disclosure shall be included in the protection scope of the embodiments of the present disclosure.

What is claimed is:

1. A digital fingerprint generation circuit based on an integrated circuit, comprising: a control unit, a first clock generator, a second clock generator, and a frequency detector, wherein
    the control unit is electrically coupled with the first clock generator and the second clock generator, and the control unit is configured to: generate a first control word and a second control word, transmit the first control word to the first clock generator, and transmit the second control word to the second clock generator;
    the first clock generator is further electrically coupled with the frequency detector, and the first clock generator is configured to: generate a first clock signal based on the first control word and transmit the first clock signal to the frequency detector;
    the second clock generator is further electrically coupled with the frequency detector, and the second clock generator is configured to: generate a second clock signal based on the second control word and transmit the second clock signal to the frequency detector; and
    the frequency detector is configured to generate a digital fingerprint of the integrated circuit based on the first clock signal and the second clock signal;
    wherein the first clock generator and the second clock generator have different manufacturing deviations, and both of the first control word and the second control word have an integer portion and a fraction portion.

2. The digital fingerprint generation circuit according to claim 1, wherein the frequency detector is configured to:
    output a first parameter value in response to a difference between a period of the second clock signal and a period of the first clock signal being greater than or equal to a difference threshold;
    output a second parameter value in response to the difference between the period of the second clock signal and the period of the first clock signal being less than the difference threshold;
    wherein after a plurality of periods, the digital fingerprint of the integrated circuit is formed by at least one first parameter value and at least one second parameter value output by the frequency detector.

3. The digital fingerprint generation circuit according to claim 2, wherein the difference threshold is 0.

4. The digital fingerprint generation circuit according to claim 2, wherein the first parameter value is 1, and the second parameter value is 0.

5. The digital fingerprint generation circuit according to claim 2, wherein the frequency detector comprises a D flip-flop.

6. The digital fingerprint generation circuit according to claim 2, wherein an output of the frequency detector comprises a response to a challenge of the digital fingerprint generation circuit, wherein
    the challenge of the digital fingerprint generation circuit is a set comprising the first control word, the second control word, a first initial address of the first clock signal, and a second initial address of the second clock signal; and
    the response from the digital fingerprint generation circuit to the challenge is the digital fingerprint, and the response is a physical unclonable function with respect to the first control word, the second control word, the first initial address of the first clock signal, and the second initial address of the second clock signal.

7. The digital fingerprint generation circuit according to claim 1, wherein
    the first clock generator is a clock generator based on a time-average-frequency direct period synthesis; and
    the first clock generator is configured to periodically accumulate the first control words to generate first clock signals having different periods.

8. The digital fingerprint generation circuit according to claim 1, wherein
    the second clock generator is the clock generator based on a time-average-frequency direct period synthesis; and
    the second clock generator is configured to periodically accumulate the second control words to generate second clock signals having different periods.

9. The digital fingerprint generation circuit according to claim 1, wherein the fraction portion is 0.5.

10. The digital fingerprint generation circuit according to claim 1, further comprising: a third clock generator and a fourth clock generator, wherein
    the control unit is further electrically coupled with the third clock generator and the fourth clock generator, and the control unit is further configured to: generate a third control word and a fourth control word, transmit the third control word to the third clock generator, and transmit the fourth control word to the fourth clock generator;
    the third clock generator is further electrically coupled with the frequency detector, and the third clock generator is configured to: generate a third clock signal based on the third control word and transmit the third clock signal to the frequency detector;
    the fourth clock generator is further electrically coupled with the frequency detector, and the fourth clock generator is configured to: generate a fourth clock signal based on the fourth control word and transmit the fourth clock signal to the frequency detector; and
    the frequency detector is further configured to generate the digital fingerprint of the integrated circuit based on any two of the first clock signal, the second clock signal, the third clock signal, and the fourth clock signal;

wherein the first clock generator, the second clock generator, the third clock generator, and the fourth clock generator have different manufacturing deviations from each other, and both of the third control word and the fourth control word have an integer portion and a fraction portion.

11. The digital fingerprint generation circuit according to claim 9, further comprising: a clock source, wherein
the clock source is electrically coupled with the first clock generator, the second clock generator, the third clock generator, and the fourth clock generator, and configured to generate a clock signal.

12. The digital fingerprint generation circuit according to claim 11, wherein the clock source is further electrically coupled with the control unit, and the control unit is further configured to configure a frequency of the clock signal generated by the clock source.

13. The digital fingerprint generation circuit according to claim 11, wherein the frequency detector comprises a D flip-flop; the frequency detector is configured to: output a first parameter value in response to a difference between a period of the second clock signal and a period of the first clock signal being greater than or equal to a difference threshold; output a second parameter value in response to the difference between the period of the second clock signal and the period of the first clock signal being less than the difference threshold; wherein after a plurality of periods, the digital fingerprint of the integrated circuit is formed by at least one first parameter value and at least one second parameter value output by the frequency detector; the difference threshold is 0; the first parameter value is 1 and the second parameter value is 0;
an output of the frequency detector comprises a response to a challenge of the digital fingerprint generation circuit;
the challenge of the digital fingerprint generation circuit is a set comprising the first control word, the second control word, a first initial address of the first clock signal, and a second initial address of the second clock signal;
the response from the digital fingerprint generation circuit to the challenge is the digital fingerprint, and the response is a physical unclonable function with respect to the first control word, the second control word, the first initial address of the first clock signal, and the second initial address of the second clock signal;
the first clock generator and the second clock are a clock generator based on a time-average-frequency direct period synthesis;
the first clock generator is configured to periodically accumulate the first control words to generate first clock signals having different periods;
the second clock generator is configured to periodically accumulate the second control words to generate second clock signals having different periods; and
the fraction portion is 0.5.

14. An integrated circuit, comprising a power source and a digital fingerprint generation circuit, wherein the power source is electrically coupled with the digital fingerprint generation circuit, and the power source is configured to supply power to the digital fingerprint generation circuit; and the digital fingerprint generation circuit comprises: a control unit, a first clock generator, a second clock generator, and a frequency detector, wherein
the control unit is electrically coupled with the first clock generator and the second clock generator, and the control unit is configured to: generate a first control word and a second control word, transmit the first control word to the first clock generator, and transmit the second control word to the second clock generator;
the first clock generator is further electrically coupled with the frequency detector, and the first clock generator is configured to: generate a first clock signal based on the first control word and transmit the first clock signal to the frequency detector;
the second clock generator is further electrically coupled with the frequency detector, and the second clock generator is configured to: generate a second clock signal based on the second control word and transmit the second clock signal to the frequency detector; and
the frequency detector is configured to generate a digital fingerprint of the integrated circuit based on the first clock signal and the second clock signal;
wherein the first clock generator and the second clock generator have different manufacturing deviations, and both of the first control word and the second control word have an integer portion and a fraction portion.

15. A digital fingerprint generation method of an integrated circuit, applicable to a digital fingerprint generation circuit, the digital fingerprint generation circuit comprising: a control unit, a first clock generator, a second clock generator, and a frequency detector, wherein the control unit is electrically coupled with the first clock generator and the second clock generator, and both of the first clock generator and the second clock generator are further electrically coupled with the frequency detector; the method comprising:
generating a first control word and a second control word and transmitting the first control word to the first clock generator and the second control word to the second clock generator by the control unit;
generating a first clock signal based on the first control word and transmitting the first clock signal to the frequency detector by the first clock generator;
generating a second clock signal based on the second control word and transmitting the second clock signal to the frequency detector by the second clock generator; and
generating a digital fingerprint of the integrated circuit based on the first clock signal and the second clock signal by the frequency detector;
wherein the first clock generator and the second clock generator have different manufacturing deviations, and both of the first control word and the second control word have an integer portion and a fraction portion.

16. The method according to claim 15, wherein generating the digital fingerprint of the integrated circuit based on the first clock signal and the second clock signal by the frequency detector comprises:
outputting a first parameter value by the frequency detector in response to a difference between a period of the second clock signal and a period of the first clock signal being greater than or equal to a difference threshold;
outputting a second parameter value by the frequency detector in response to a difference between the period of the second clock signal and the period of the first clock signal being less than the difference threshold;
wherein after a plurality of periods, the digital fingerprint of the integrated circuit is formed by at least one first parameter value and at least one second parameter value output by the frequency detector.

17. The method according to claim 15, wherein the first clock generator is a clock generator based on a time-average-frequency direct period synthesis; and generating the first clock signal based on the first control word by the first clock generator comprises:
    periodically accumulating the first control words in the first clock generator to generate first clock signals having different periods.

18. The method according to claim 15, wherein the second clock generator is a clock generator based on a time-average-frequency direct period synthesis; and
    generating the second clock signal based on the second control word by the second clock generator comprises:
        periodically accumulating the second control words in the second clock generator to generate second clock signals having different periods.

19. The method according to claim 15, wherein the fraction portion is 0.5.

20. The method according to claim 15, wherein the digital fingerprint generation circuit further comprises: a third clock generator and a fourth clock generator, wherein the control unit is further electrically coupled with the third clock generator and the fourth clock generator, and both of the third clock generator and the fourth clock generator are further electrically coupled with the frequency detector; the method further comprising:
    generating a third control word and a fourth control word and transmitting the third control word to the third clock generator and the fourth control word to the fourth clock generator by the control unit;
    generating a third clock signal based on the third control word and transmitting the third clock signal to the frequency detector by the third clock generator; and
    generating a fourth clock signal based on the fourth control word and transmitting the fourth clock signal to the frequency detector by the fourth clock generator;
    generating the digital fingerprint of the integrated circuit based on the first clock signal and the second clock signal by the frequency detector comprises:
        generating the digital fingerprint of the integrated circuit based on any two of the first clock signal, the second clock signal, the third clock signal, and the fourth clock signal by the frequency detector;
    wherein the first clock generator, the second clock generator, the third clock generator, and the fourth clock generator have different manufacturing deviations from each other, and both of the third control word and the fourth control word have an integer portion and a fraction portion.

* * * * *